US010702976B2

(12) United States Patent
Poppe et al.

(10) Patent No.: US 10,702,976 B2
(45) Date of Patent: Jul. 7, 2020

(54) POLE CLAMP

(71) Applicant: GCX Corporation, Petaluma, CA (US)

(72) Inventors: Carl Hermann Poppe, Sebastopol, CA (US); Ronald Jesse Caywood, Rohnert Park, CA (US)

(73) Assignee: GCX Corporation, Petaluma, CA (US)

( * ) Notice: Subject to any disclaimer, the term of this patent is extended or adjusted under 35 U.S.C. 154(b) by 0 days.

(21) Appl. No.: 16/001,583

(22) Filed: Jun. 6, 2018

(65) Prior Publication Data
US 2019/0375074 A1    Dec. 12, 2019

(51) Int. Cl.
| | |
|---|---|
| *B25B 5/14* | (2006.01) |
| *B25B 5/04* | (2006.01) |
| *F16B 2/18* | (2006.01) |
| *F16M 13/02* | (2006.01) |
| *F16B 2/10* | (2006.01) |
| *B25B 5/16* | (2006.01) |

(52) U.S. Cl.
CPC ............... *B25B 5/147* (2013.01); *B25B 5/04* (2013.01); *B25B 5/16* (2013.01); *F16B 2/10* (2013.01); *F16B 2/185* (2013.01); *F16M 13/022* (2013.01)

(58) Field of Classification Search
CPC ... B25B 5/04; B25B 5/16; B25B 5/147; F16B 2/10; F16M 13/02; F16M 13/022
See application file for complete search history.

(56) References Cited

U.S. PATENT DOCUMENTS

| | | | | |
|---|---|---|---|---|
| 2,672,778 | A | * | 3/1954 | Jones ...................... B25B 7/123 81/368 |
| 2,751,801 | A | * | 6/1956 | Hostetter ................ B25B 7/123 81/378 |
| 2,777,347 | A | * | 1/1957 | Sendoykas .............. B25B 7/123 81/379 |
| 3,354,759 | A | | 11/1967 | Cook |
| 3,981,209 | A | * | 9/1976 | Caroff ........................ B25B 7/10 81/367 |
| 4,499,797 | A | | 2/1985 | Wilson |
| 4,669,341 | A | * | 6/1987 | Small ........................ B25B 7/02 227/147 |
| RE32,614 | E | | 3/1988 | Wilson |
| 4,890,520 | A | | 1/1990 | Vassiliou |

(Continued)

FOREIGN PATENT DOCUMENTS

| | | |
|---|---|---|
| CN | 103128682 A | 6/2013 |
| EP | 0357377 A2 | 3/1990 |

(Continued)

*Primary Examiner* — Eret C McNichols
(74) *Attorney, Agent, or Firm* — Perkins Coie LLP; Michael Glenn

(57) ABSTRACT

Presented here is a pole clamp that can be operated by a single hand, and which can clamp onto objects of various sizes and shapes. The clamp can be operated using a handle which, when pushed in an opening direction opposite a base member, opens the jaws on the clamp. The motion of the handle can adjust the opening of the jaws. In addition, the opening of the jaws can be adjusted using a thumb dial which can shorten and lengthen a locking member, which in turn adjusts the opening of the jaws. The clamp can lock onto the object when the handle is pushed in a direction opposite the opening direction, past the dead center point, and the locking member prevents further movement of the handle.

21 Claims, 14 Drawing Sheets

(56) References Cited

U.S. PATENT DOCUMENTS

| | | | |
|---|---|---|---|
| 5,052,252 A | 10/1991 | Szymber et al. | |
| 5,056,385 A | 10/1991 | Petersen | |
| 5,058,869 A * | 10/1991 | Ruthven | B25B 7/00 269/228 |
| 5,209,562 A * | 5/1993 | Glassford | F21S 6/003 362/294 |
| 5,305,669 A * | 4/1994 | Kimbro | B25B 7/00 81/423 |
| 5,351,585 A * | 10/1994 | Leseberg | B25B 7/123 81/426 |
| 5,933,924 A * | 8/1999 | Nowlen | H01B 17/16 24/132 R |
| 5,991,997 A * | 11/1999 | Schley | B25B 7/02 29/268 |
| 6,006,420 A * | 12/1999 | Mills | H02G 1/14 269/45 |
| 6,014,917 A | 1/2000 | Bally et al. | |
| 6,095,019 A | 8/2000 | Warheit et al. | |
| 6,155,142 A * | 12/2000 | Bally | B25B 7/10 81/389 |
| 6,199,458 B1 | 3/2001 | Wrigley et al. | |
| 6,279,431 B1 * | 8/2001 | Seber | B25B 7/10 81/357 |
| 6,378,404 B1 | 4/2002 | Bally et al. | |
| 6,408,724 B1 | 6/2002 | Whiteford | |
| 6,564,703 B1 | 5/2003 | Lin et al. | |
| 6,585,400 B2 * | 7/2003 | Leen | F21L 14/02 362/371 |
| 6,591,719 B1 | 7/2003 | Poole et al. | |
| 6,626,070 B2 | 9/2003 | Peperkorn et al. | |
| 6,658,971 B2 * | 12/2003 | Delbrugge, Jr. | B25B 7/10 81/355 |
| 7,389,714 B1 | 6/2008 | Heagerty | |
| 7,444,907 B2 * | 11/2008 | Seber | B25B 7/10 81/357 |
| 7,895,925 B2 * | 3/2011 | Chang | H04R 1/08 269/3 |
| 8,602,662 B1 * | 12/2013 | Mans | F16M 11/041 396/428 |
| 8,857,775 B1 * | 10/2014 | Clearman | G03B 17/561 24/334 |
| 9,010,222 B2 * | 4/2015 | Peirce | B25B 7/10 81/319 |
| 9,144,160 B2 * | 9/2015 | Chuang | F16M 11/14 |
| 9,527,191 B2 * | 12/2016 | Chen | B25B 7/04 |
| 9,810,250 B2 * | 11/2017 | Penzes | F16B 2/10 |
| 9,945,514 B1 * | 4/2018 | Huang | F16M 13/022 |
| 9,950,675 B2 | 4/2018 | Schactman et al. | |
| 10,495,953 B2 * | 12/2019 | Calhoun | G03B 17/561 |
| 2004/0089778 A1 * | 5/2004 | Valentine | F16M 11/40 248/229.13 |
| 2005/0050702 A1 * | 3/2005 | Green | B25B 27/10 29/263 |
| 2007/0089572 A1 | 4/2007 | Hunter | |
| 2007/0131068 A1 | 6/2007 | McNatt | |
| 2009/0255314 A1 | 10/2009 | Badiali | |
| 2010/0018365 A1 * | 1/2010 | Tyler | B25B 5/12 81/423 |
| 2010/0244349 A1 | 9/2010 | Moutafis | |
| 2012/0297938 A1 * | 11/2012 | Lai | B25B 7/04 81/356 |
| 2015/0008631 A1 * | 1/2015 | Liu | B25B 7/04 269/164 |
| 2016/0067846 A1 * | 3/2016 | Christensen | B25B 5/163 269/160 |
| 2016/0207470 A1 * | 7/2016 | Zander | B60R 9/048 |
| 2016/0333908 A1 * | 11/2016 | Burnett | F16B 2/185 |
| 2017/0021474 A1 * | 1/2017 | Gallagher | B25B 5/147 |
| 2017/0049956 A1 * | 2/2017 | Kitchen | F16B 2/10 |
| 2018/0003338 A1 * | 1/2018 | Scott | A45F 5/00 |
| 2018/0066684 A1 * | 3/2018 | Burnett | B25B 5/12 |
| 2019/0074111 A1 * | 3/2019 | Pyron | H02G 3/0456 |
| 2019/0086007 A1 * | 3/2019 | Ahrens | F16L 23/06 |
| 2019/0265581 A1 * | 8/2019 | Calhoun | G03B 17/561 |

FOREIGN PATENT DOCUMENTS

| | | |
|---|---|---|
| EP | 0865880 A1 | 9/1998 |
| EP | 1043101 A2 | 10/2000 |
| FR | 2741830 A1 | 6/1997 |
| FR | 2807355 A1 | 10/2001 |

* cited by examiner

POLE CLAMP

TECHNICAL FIELD

The present application is related to a clamping mechanism, and more specifically to methods and systems that can clamp onto objects having various thicknesses.

BACKGROUND

Today, electronic devices are ubiquitous in various areas of human endeavor such as classrooms, hospitals, construction sites, etc. These electronic devices can vary in size and weight, and need to be easily secured in a position for operation and viewing.

SUMMARY

Presented here is a pole clamp that can be operated by a single hand, and which can clamp onto objects of various sizes and shapes. The clamp can be operated using a handle which, when pushed in an opening direction opposite a base member, opens the jaws on the clamp. The motion of the handle can adjust the opening of the jaws. In addition, the opening of the jaws can be adjusted using a thumb dial which can shorten and lengthen a locking member, which in turn adjusts the opening of the jaws. The clamp can lock onto the object when the handle is pushed in a direction opposite the opening direction, past the dead center point, and the locking member prevents further movement of the handle.

DETAILED DESCRIPTION

Pole Clamp

Presented here is a pole clamp that can be operated by a single hand, and which can clamp onto objects of various sizes and shapes. The clamp can be operated using a handle which, when pushed in an opening direction opposite a base member, opens the jaws on the clamp. The motion of the handle can adjust the opening of the jaws. In addition, the opening of the jaws can be adjusted using a thumb dial which can shorten and lengthen a locking member, which in turn adjusts the opening of the jaws. The clamp can lock onto the object when the handle is pushed in a direction opposite the opening direction, past the dead center point, and the locking member prevents further movement of the handle.

Figure 1:
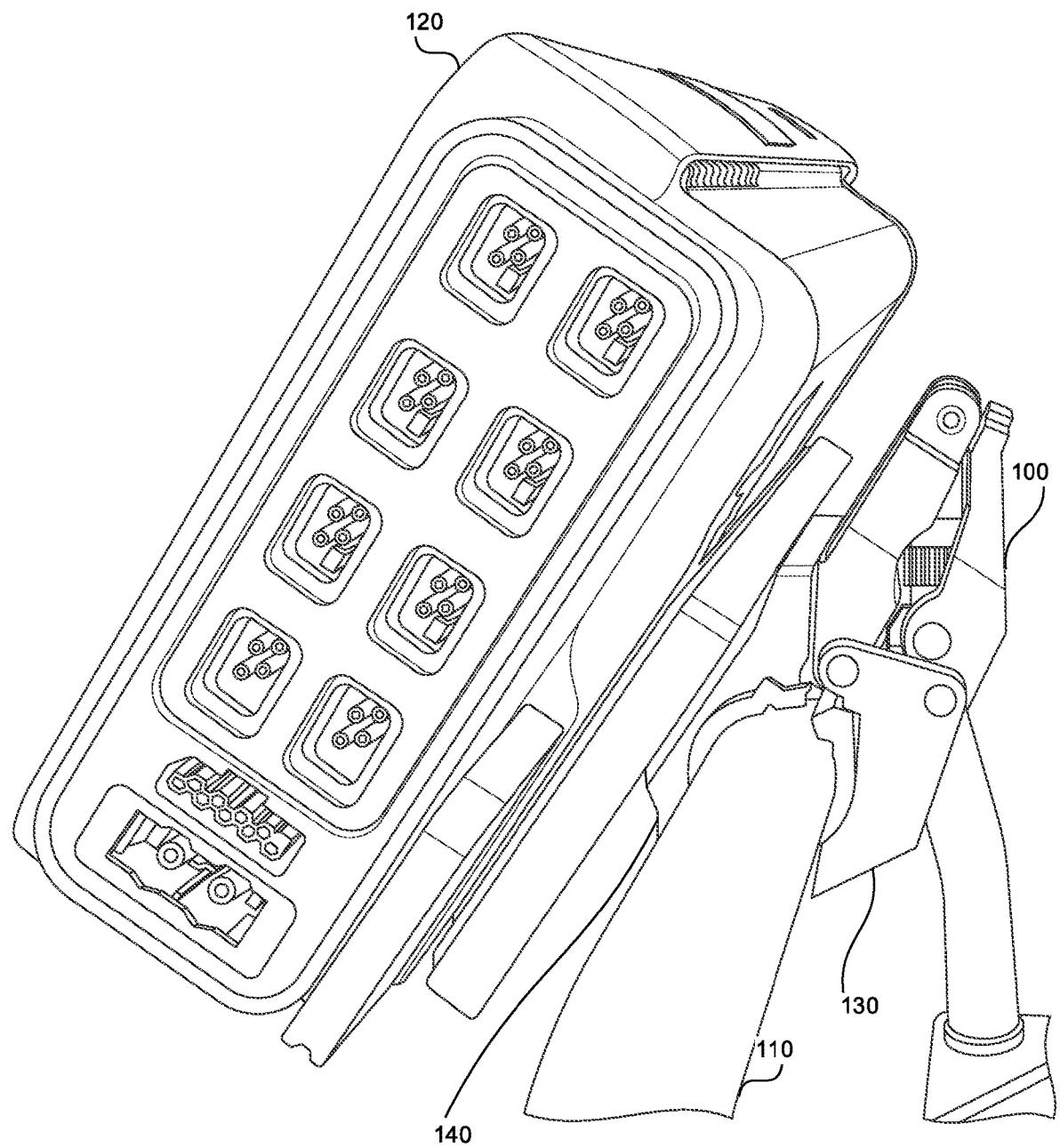
FIG. 1 shows a pole clamp securing an object and supporting the object's weight.

FIG. 1 shows a pole clamp securing an object and supporting the object's weight. The pole clamp 100 can attach to a second object 110, such as a pole, while supporting the object 120, such as a monitor, an electronic device, a mechanical device, etc. The weight of the object 120 can be as heavy as 50 pounds.

The pole clamp 100 can include two jaws, the upper jaw 130 and the lower jaw 140, which clampingly engage around the second object 110. The lower jaw 140 can have an attachment mechanism allowing the object 120 to attach to the back surface of the lower jaw 140. When mounted to the pole clamp 100, the object 120 can be vertical, horizontal, or slanted with respect to the ground.

Figure 2:
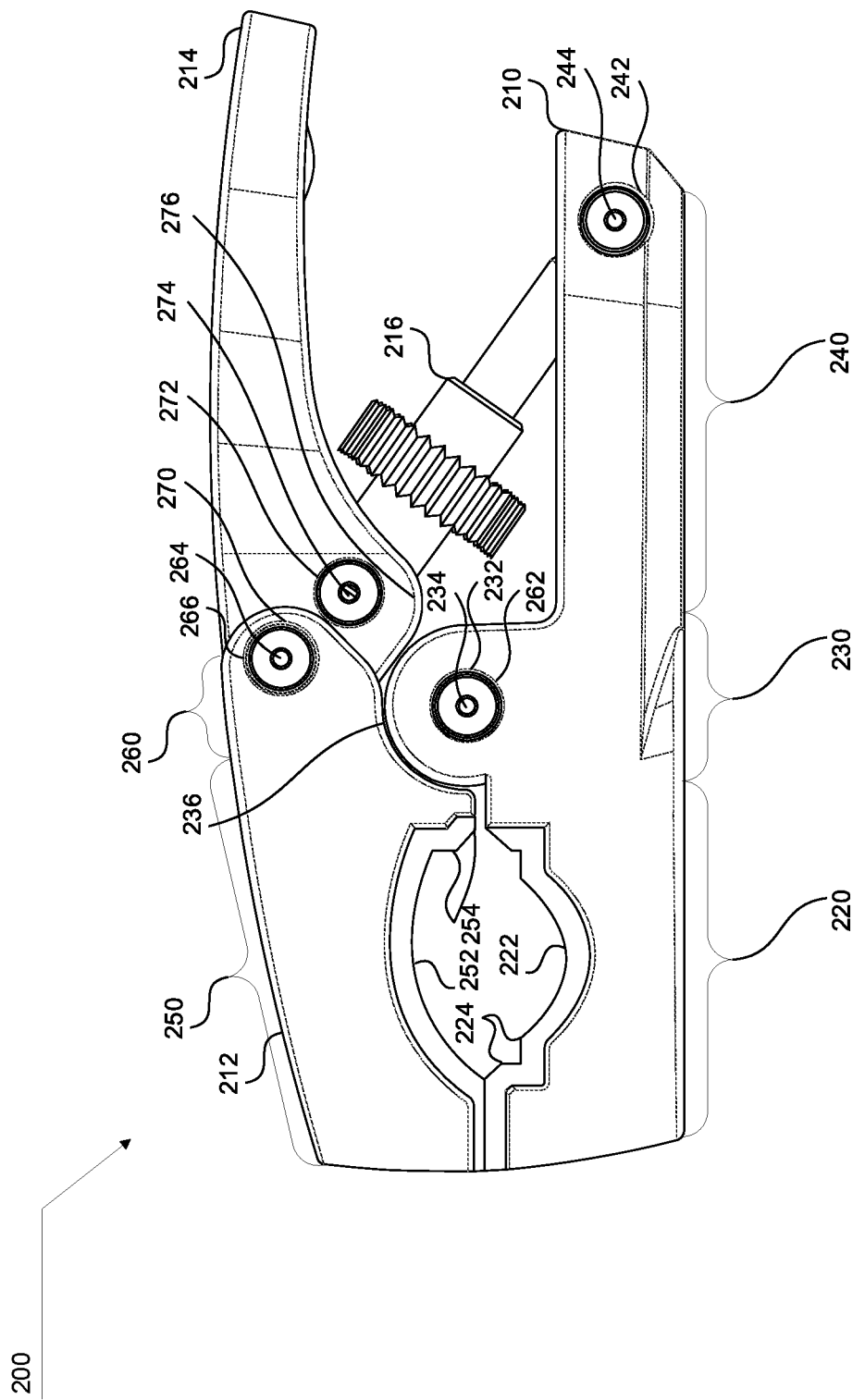
FIG. 2 shows a side view of the pole clamp.

FIG. 2 shows a side view of the pole clamp. The pole clamp 200 can include a base member 210, an upper member 212, a handle 214, and a locking member 216.

The base member 210 can have a base jaw 220, a medial portion 230 and a base handle 240. The base jaw 220 can define a base concave recess 222 with base transverse ridges 224. The medial portion 230 can have a medial aperture 232 defining a medial pivot 234, and a base protrusion 236 defining a region of enlarged thickness surrounding the medial pivot 234. The base handle 240 can have a rear aperture 242 defining a rear pivot 244.

The upper member 212 can include an upper jaw 250 and a rear portion 260. The upper jaw can define an upper concave recess 252, with upper transverse ridges 254, opposite the base concave recess 222. The rear portion 260 can have a first upper aperture 262 pivotally secured in a coaxial arrangement to the medial pivot 234 of the base member 210, and can have a second upper aperture 266 defining a second upper pivot 264. The base and upper concave recesses 222, 252 can take on any combination of the following shapes: linear, circular, elliptical, etc.

The handle 214 can define a first handle aperture 270 pivotally secured in the coaxial arrangement to the second upper pivot 264 of the upper member 212. The handle 214 can have a second handle aperture 272 defining a handle pivot 274, and a handle protrusion 276 defining a region of enlarged thickness surrounding the handle pivot 274. The base protrusion 236 and the handle protrusion 276 strengthen the base member 210 and the handle 214 in the regions where large forces are exerted while it is in the clamping position, thus preventing breaking of the clamp.

The locking member 216 can have a proximal end and a distal end. The proximal end can be pivotally secured to the rear pivot 244 of the base member 210. The distal end can be pivotally secured to the handle pivot 274. The locking member 216 can lock a position of the upper jaw 250 with respect to the base jaw 220 when the handle pivot 274 is past a dead center point and creates an angle greater than 180° with respect to the second upper pivot 264 and the rear pivot 244 of the base member 210.

Figure 3:
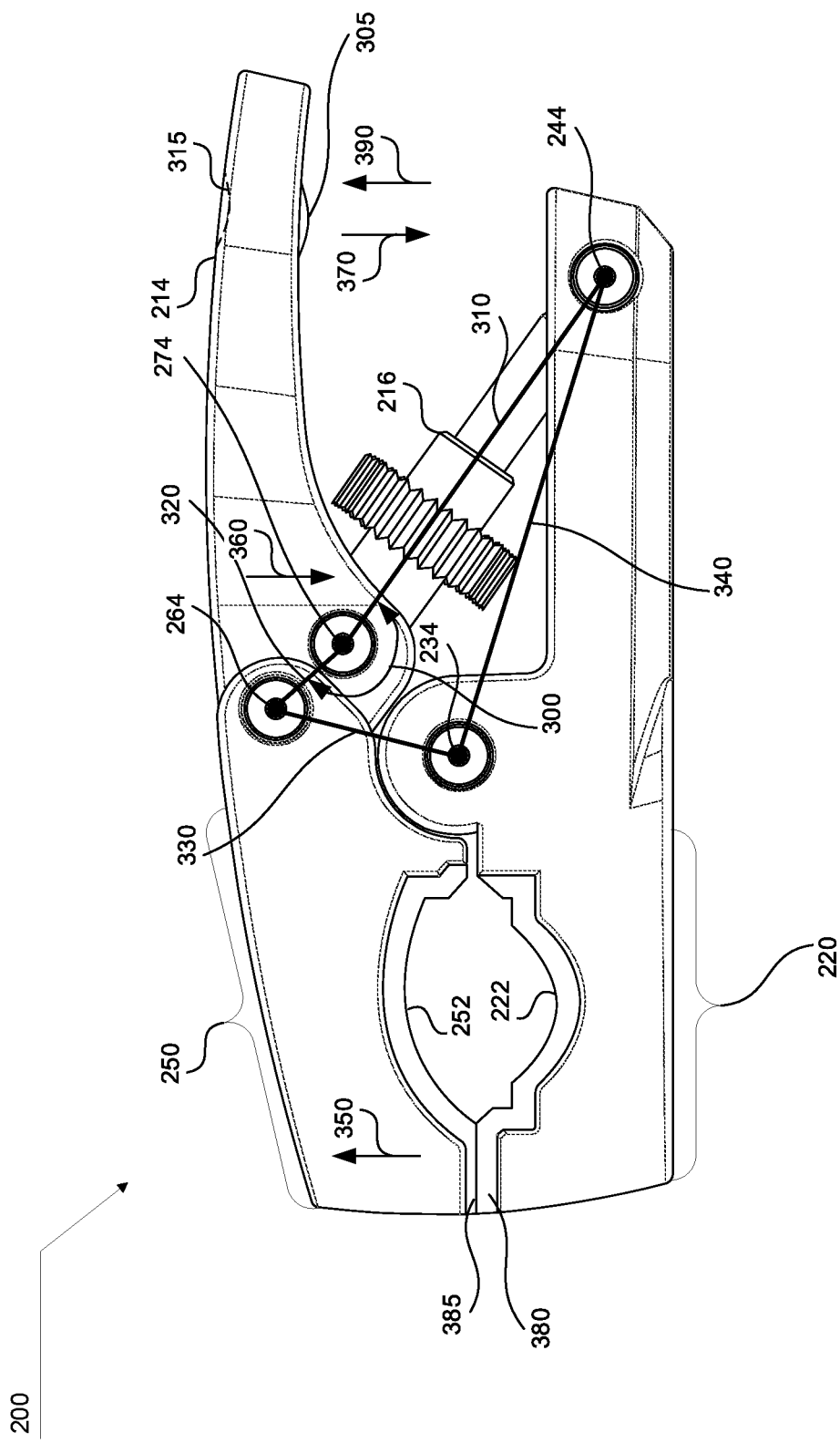
FIG. 3 shows length ratios and angles between various pivot points of the clamp.

FIG. 3 shows length ratios and angles between various pivot points of the clamp 200. Pivot points 234, 244, 264 and 274 define a quadrilateral shape. The length of the edges 320, 330, and 340 as shown in FIG. 3 are set upon manufacturing of the clamp 200. The length of the edge 310, defined by the locking member 216, can vary as described in this application. The ratio of the edge 320 to edge 330 to edge 340 can be 0.375:0.750:2.000. This ratio does not vary during operation of the clamp 200. When the locking member 216 is fully extended, the ratio of the edge 320 to edge 330 to edge 340 to edge 310 is 0.375:0.750:2.000: 1.800.

A perimeter of the base concave recess 222 and the upper concave recess 252 can be lined with a polymer material 380, 385, respectively, to increase friction with an object clamped between the upper jaw 250 and the base jaw 220 and to prevent the jaws 220, 250 from sliding relative to the object. The polymer material 380, 385 can be neoprene. The polymer material 380 can be different from the polymer material 385. The polymer material 380, 385 can have a hardness of at least 60 durometers, and the hardness of the material 380, 385 can differ.

The locking member 216 can lock the position of the upper jaw 250 with respect to the base jaw 220 when angle 300, defined by edges 320 and 310, is greater than 180°. For example, the angle 300 can be 191.15° when the locking member 216 is locked.

The locking position can be the position of the clamp 200 as shown in FIGS. 1-3. The locking position occurs when a force is exerted in the direction 350 on the upper jaw 250. The force can be exerted by the base jaw 220 or can be exerted by an object clamped between the jaws 220, 250, such as a bar 110 in FIG. 1. The force in the direction 350 exerts a second force in the direction 360 on the handle pivot 274. However, the handle pivot 274 cannot move in the direction 360 because the locking member 216 prevents further motion in the direction 360 of the handle pivot 274 due to a set length of the edge 310 of the locking member 216. As a result, the clamp 200 is locked onto the object. The handle 214 can lock and unlock the position of the upper jaw 250 with respect to the base jaw 220, upon exertion of force in a particular direction 370 and 390, respectively.

The handle 214 can include an indication of where to exert force to lock and unlock the clamp 200. The indication can be represented by a protrusion 305 on the lower surface of the handle 214 and/or a dent 315 on the upper surface of the handle 214.

Figure 4:
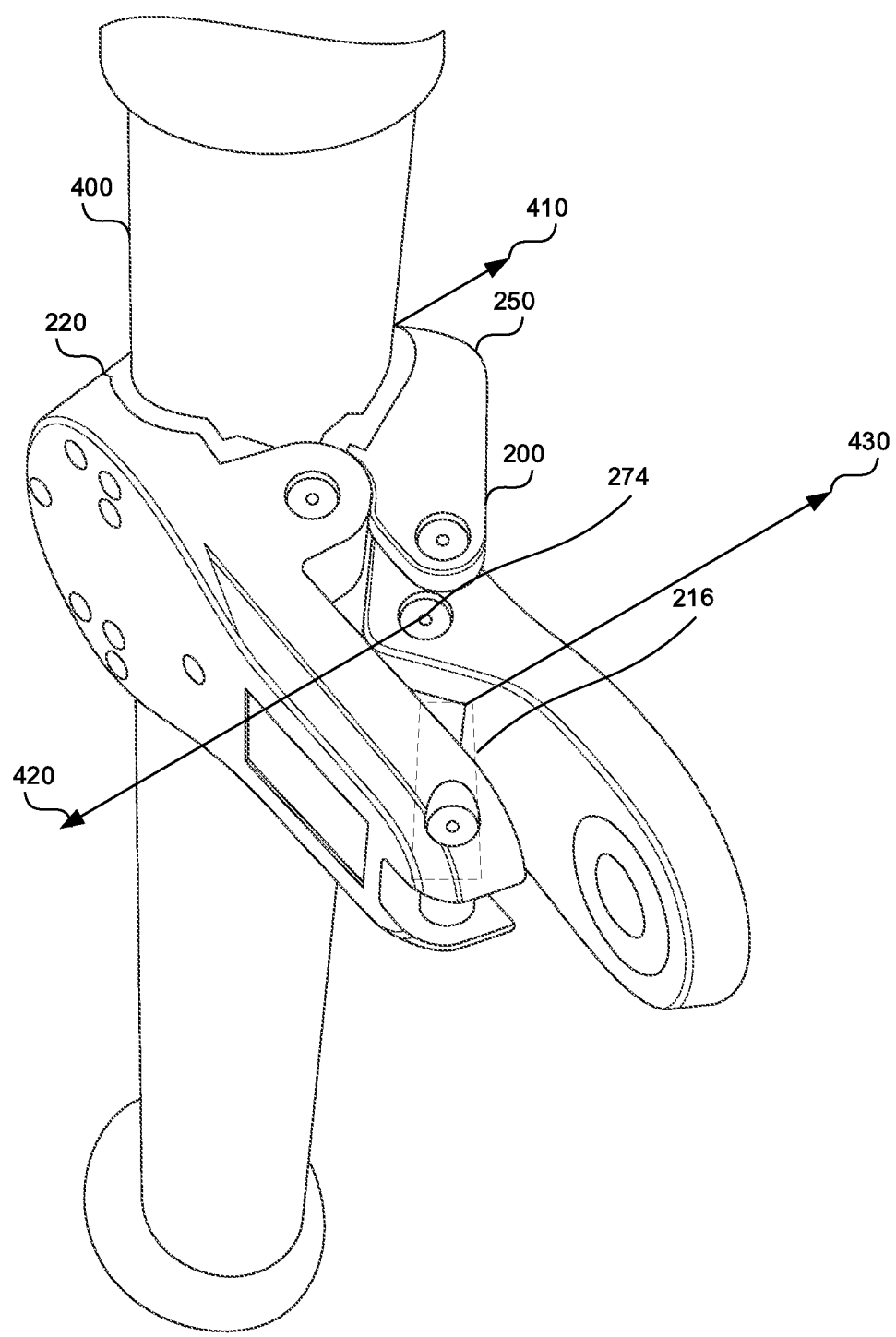
FIG. 4 shows the clamp in a locked position while clamping an object.

FIG. 4 shows the clamp 200 in a locked position while clamping an object. The clamp 200 is clamping the object 400, while the base jaw 220 and the upper jaw 250 are in an open position with respect to each other, i.e., they do not touch each other. The force in the direction 410 exerted by the object 400 in turn exerts a force in the direction 420 at the handle pivot 274. The locking member 216 exerts a counter force in the direction 430 because a further motion in the direction 420 would require a change in the length of the locking member 216, thus resulting in a locked position.

In one embodiment, the locking member 216 can lock a position of the upper jaw 250 with respect to the base jaw 220 when an object 400 clampingly engaged between the jaws 220, 250, prevents a rotation of the upper jaw 250 toward the base jaw 240, and a length of the locking member 216 prevents a rotation of the upper jaw 250 away from the base jaw 240. That is, a rotation of the upper jaw 250 away from the base jaw 240 would require a change in the length of the locking member 216.

Figure 5:
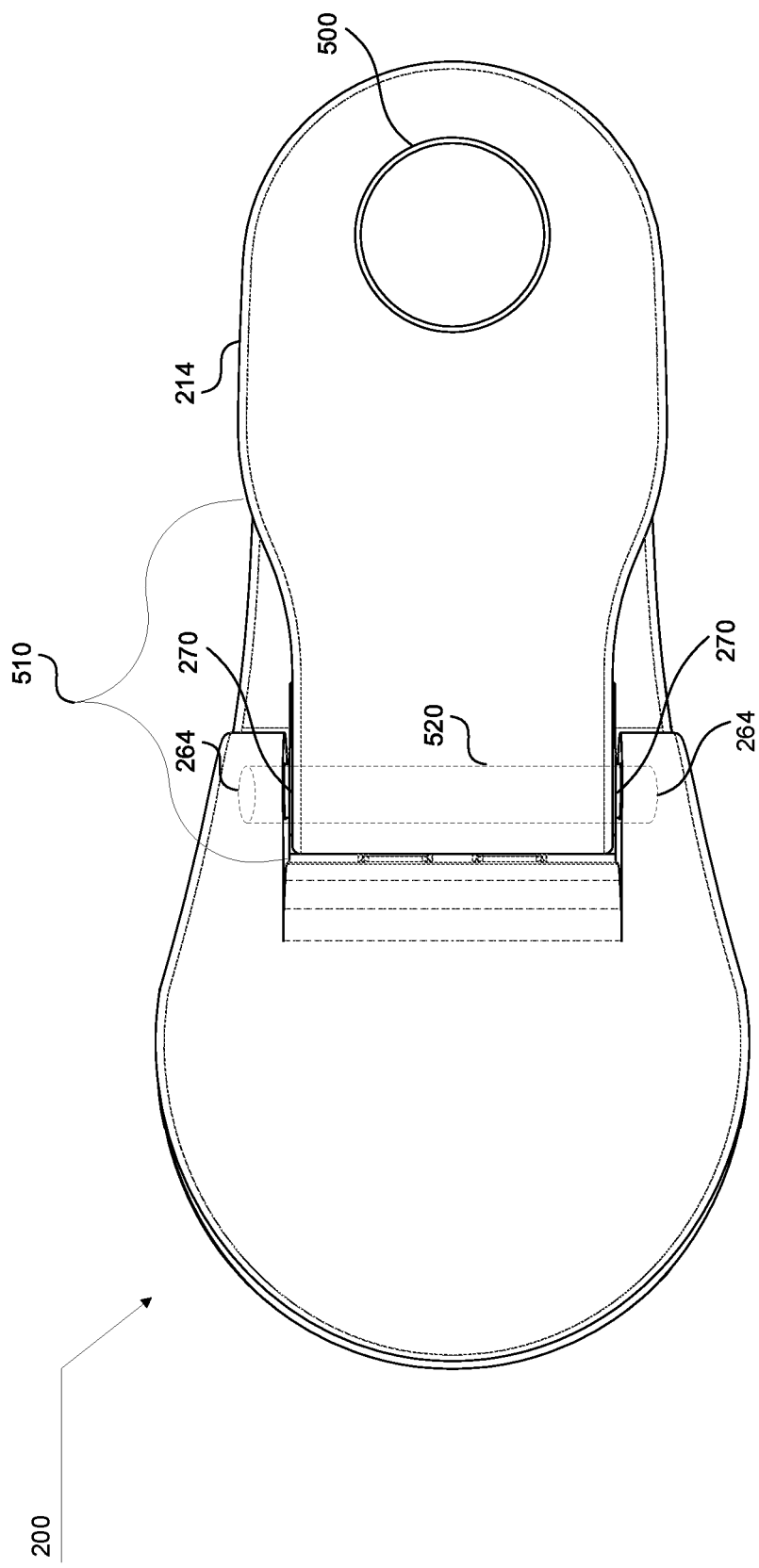
FIG. 5 shows a top view of the clamp.

FIG. 5 shows a top view of the clamp 200. The circular shape 500 can be a dent indicating where to exert pressure on the handle 214 to achieve the locking position. The handle 214 can have a reduced thickness in a region 510 surrounding a coaxial arrangement with the second upper pivot 264 (not pictured). The reduced thickness of the handle 214 can give clearance to the handle to freely rotate about the coaxial arrangement.

A rotational member 520 can be circularly symmetric and can define the second upper pivot 264 of the handle 214. The rotational member 520 can provide the attachment axis for the coaxial arrangement between the second upper pivot 264 and the first handle aperture 270. The rotational member 520 can be a cylinder with or without tapered edges.

Figure 6:
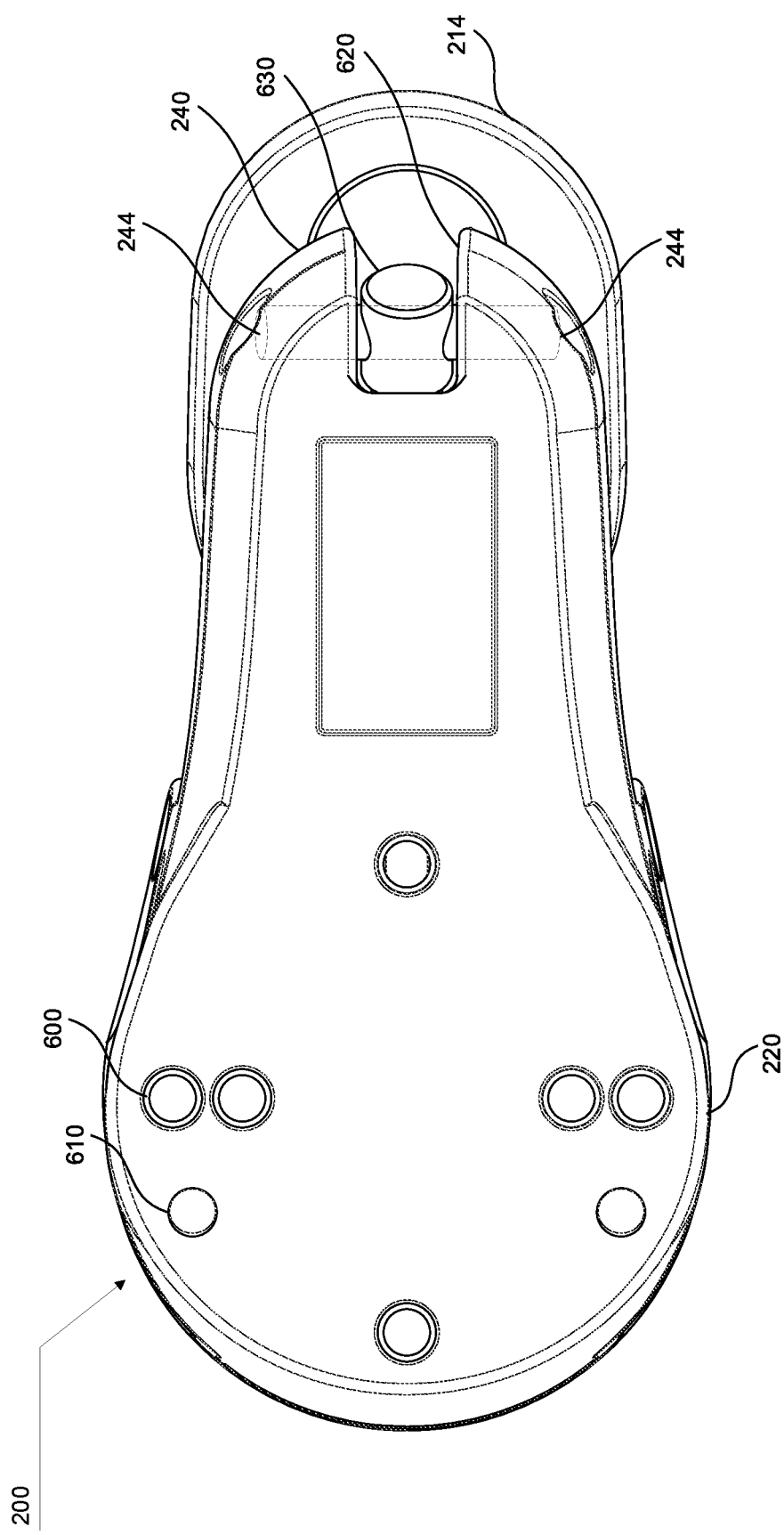
FIG. 6 shows a bottom view of the clamp.

FIG. 6 shows a bottom view of the clamp 200. The base jaw 220 can define one or more attachment members 600 (only one labeled for brevity), 610 (only one labeled for brevity) disposed on a bottom surface of the base jaw 220. The attachment members 600, 610 can engage with a corresponding attachment member to support a weight of an object associated with the corresponding attachment member. One or more of the attachment members 600, 610 can be a threaded mounting hole. The corresponding attachment member can be a threaded screw which can be secured to the threaded mounting hole 600, 610. One or more of the attachment members 600, 610 can be a mounting hole, without threading, through which a corresponding protrusion can be inserted.

The base handle 240 can be bisected by a notch 620 coaxial with the rear pivot 244. The proximal end 630 of the locking member can be mounted within the notch 620 of the base handle 240. As seen in FIG. 6, a rear portion of the handle 214 can extend beyond a rear portion of the base handle 240.

Figure 7:
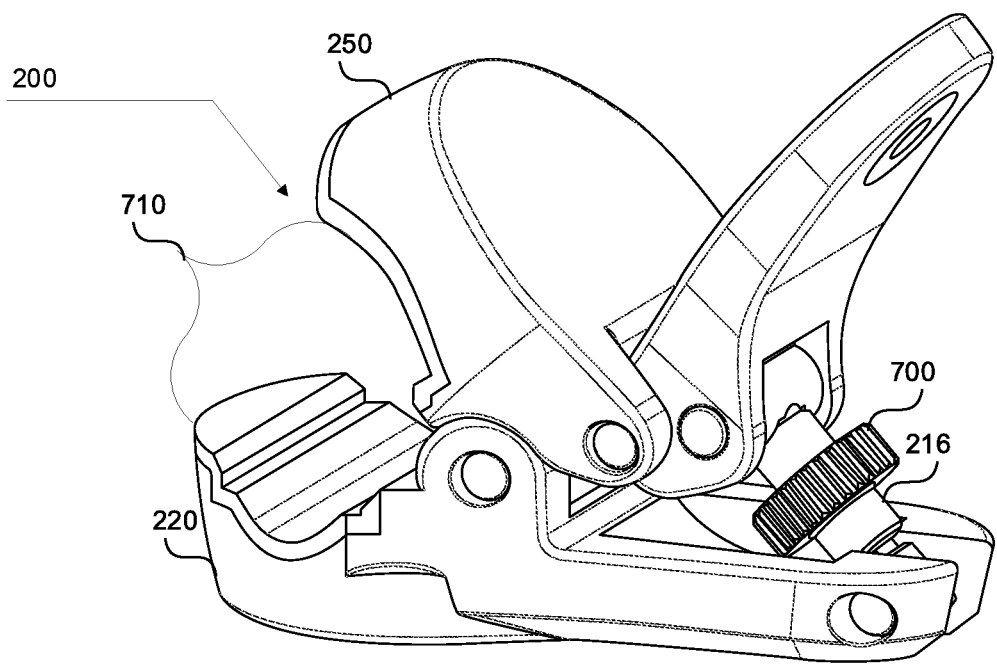
FIGS. 7-8 show an adjustment of the locking member.
Figure 8:
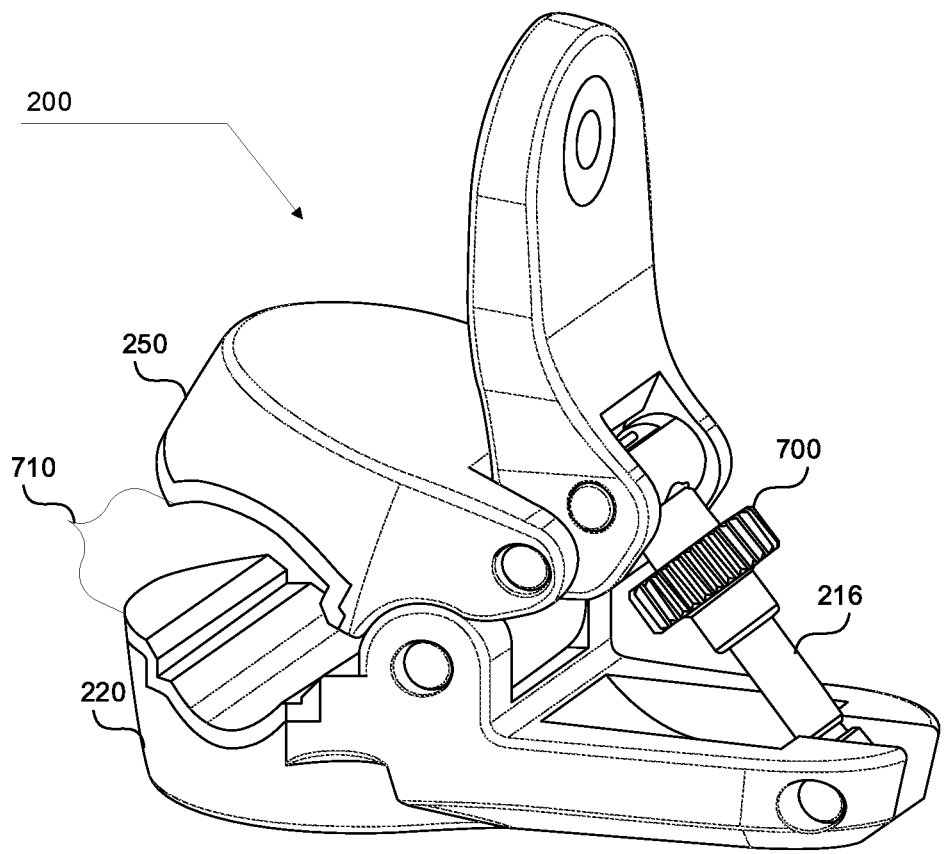

FIGS. 7-8 show an adjustment of the locking member 216. The locking member 216 can include a control member 700 rotationally coupled to the locking member 216. The rotational motion of the control member 700 can adjust the length of the locking member 216 and a size of an opening 710 between the base jaw 220 and the upper jaw 250. The control member 700 can be a thumb dial. FIG. 7 shows the locking member 216 adjusted to its shortest length. The opening between the base jaw 220 and the upper jaw 250 is at its widest. FIG. 8 shows the locking member 216 adjusted to its maximum length. Consequently, the opening between the base jaw 220 and the upper jaw 250 is narrow.

Figure 9:
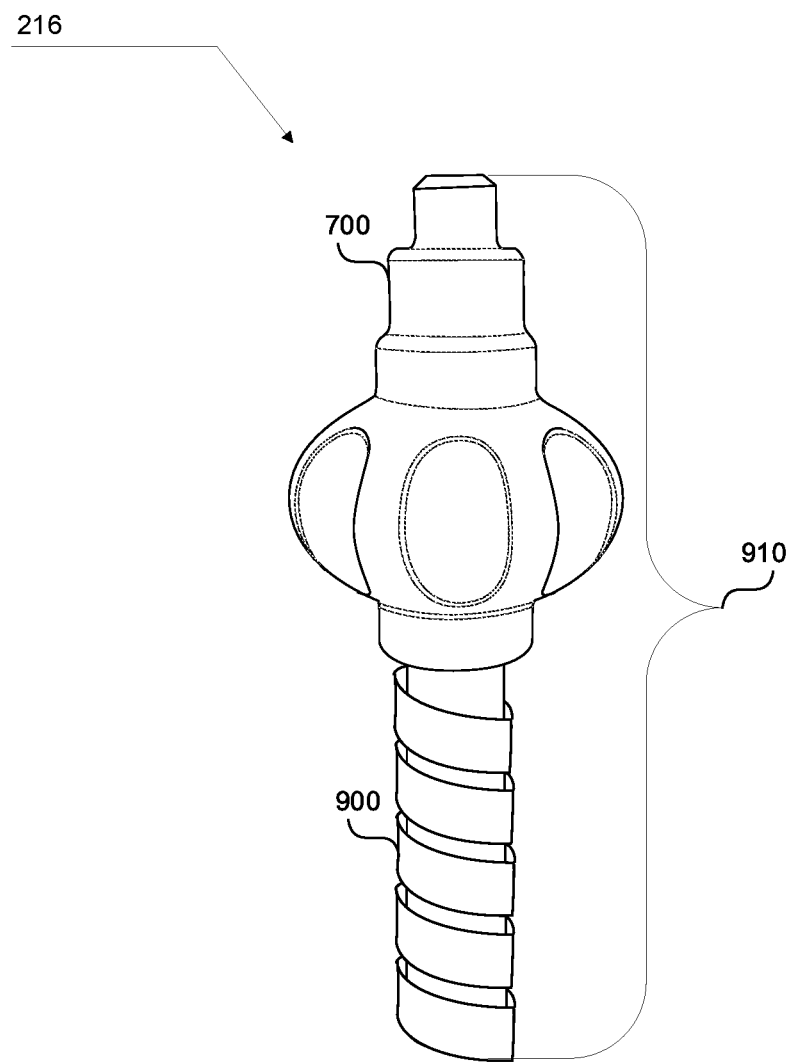
FIG. 9 shows the control member forming a part of the locking member.

FIG. 9 shows the control member 700 forming a part of the locking member 216. The locking member 216 can include the control member 700 and a threaded bar 900. The control member 700 can have a threading inside corresponding to the threading on the bar 900. The threading enables the control member 700 to slide up and down the bar 900, thus changing the total length 910 of the locking member 216. As a result, the locking position of the base jaw and the upper jaw changes.

Figure 10:
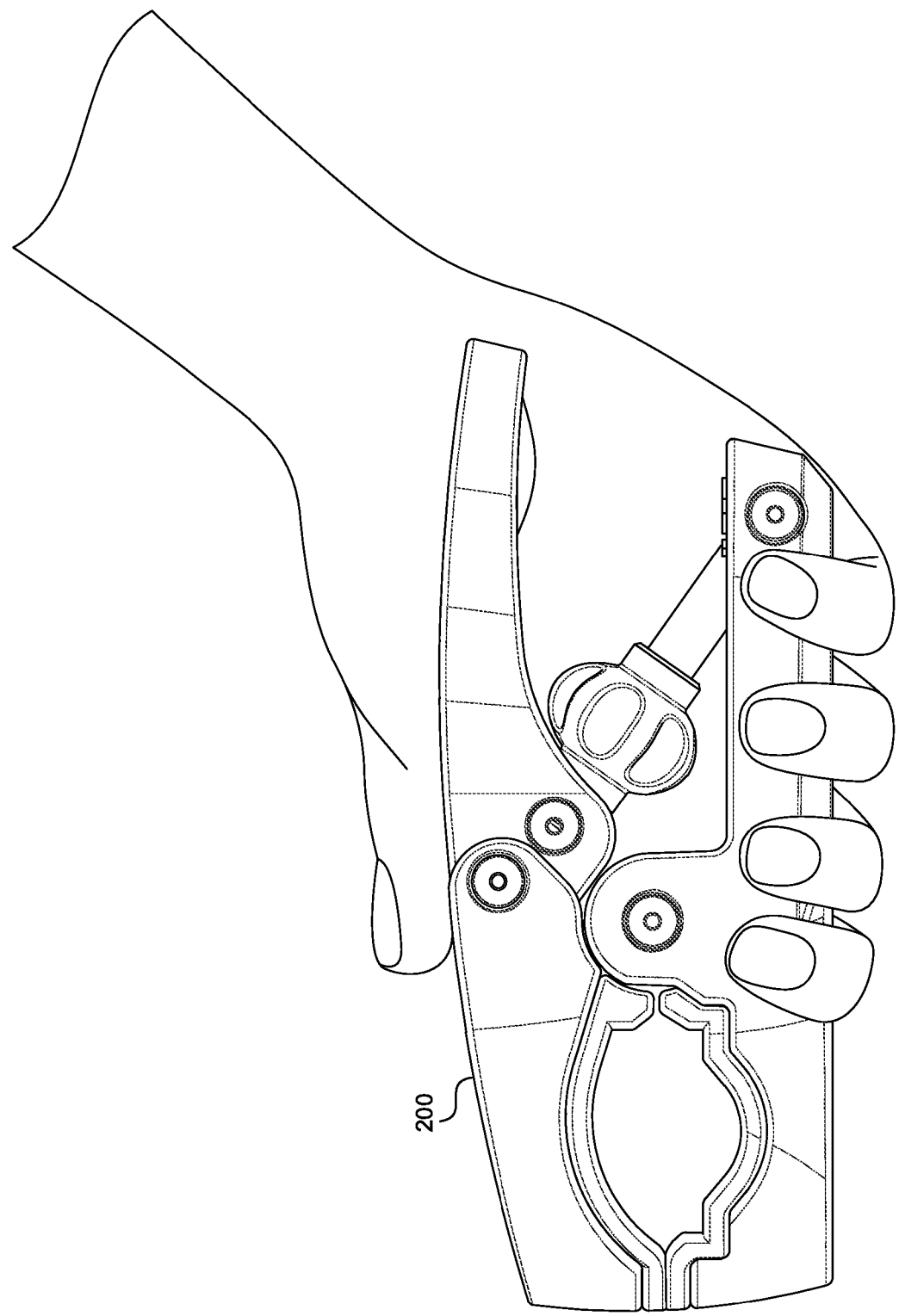
FIG. 10 shows the clamp operated by a single hand of the user.

FIG. 10 shows the clamp 200 being operated by a single hand of the user. The ability to operate the clamp 200 using a single hand can be important in a situation when the user has to handle multiple objects such as the clamp 200, an object to clamp it to, and an object secured to the clamp 200.

Figure 11:
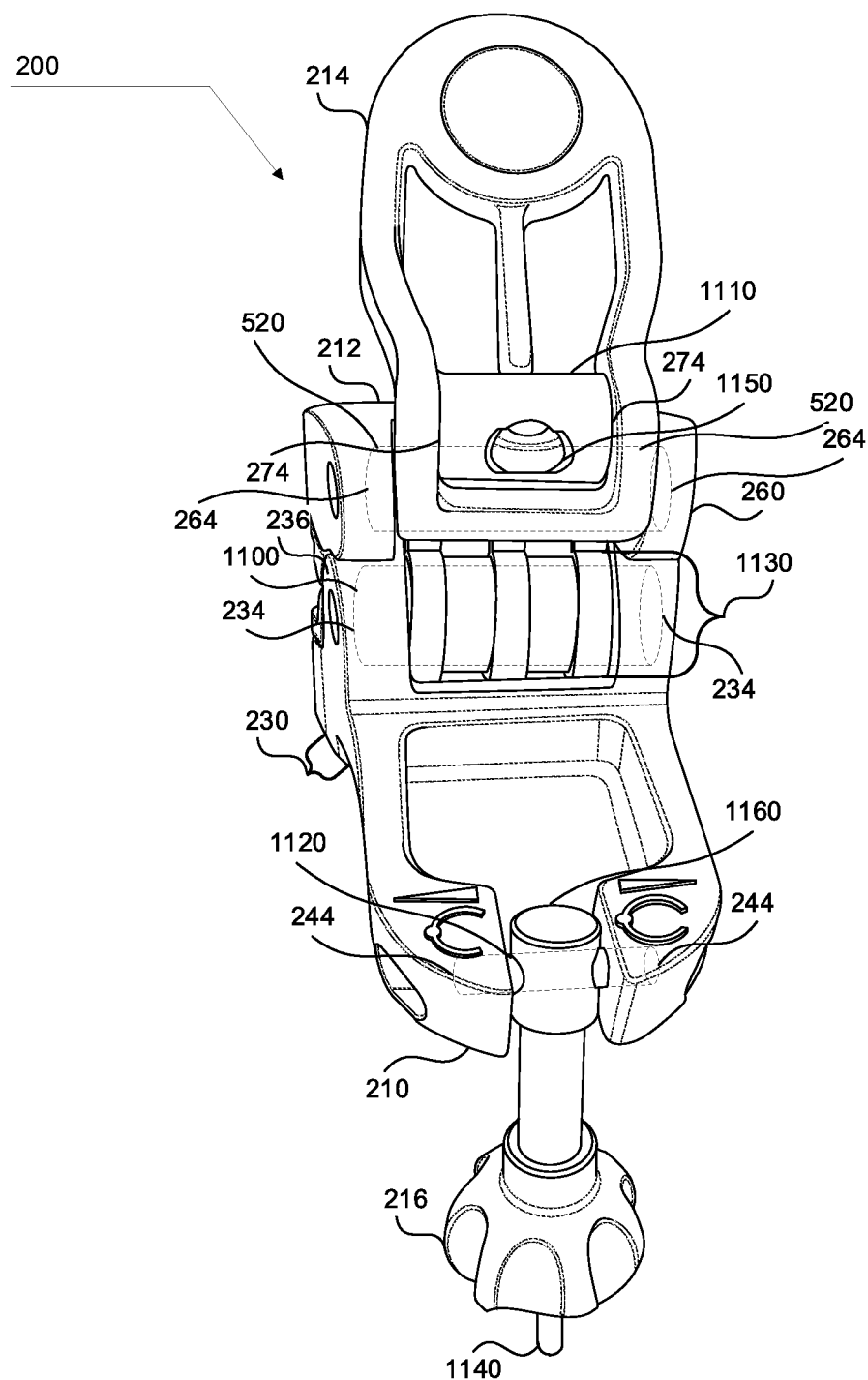
FIG. 11 shows various rotational members in coaxial arrangements within the clamp.

FIG. 11 shows various rotational members in coaxial arrangements within the clamp 200. In FIG. 11, for illustration purposes, the locking member 216 has been loosened at the distal end 1140 from its attachment point 1150. The rotational members 1100, 520, 1110, 1120 can be circularly symmetric, and can be cylinders with or without tapered ends.

The first rotational member 1100 can be a cylinder with or without tapered ends. The first rotational member 1100 can define the medial pivots and can provide an attachment axis for the coaxial arrangement between the medial pivot and the first upper aperture. The first rotational member 1100 can extend through the base protrusion 236 of the medial portion 230 of the base member 210 and through a protrusion 1130 of the rear portion 260 of the upper member 212. The first rotational member 1100 can connect two medial pivots 234.

The second rotational member 520 can define the second upper pivots and can provide the attachment axis for the coaxial arrangement between the second upper pivot and the first handle aperture. The second rotational member 520 can extend through rear portion 260 of the upper member 212 and through a region of reduced thickness 510 (shown in FIG. 5) of the handle 214. The second rotational member 520 can connect two second upper pivots 264.

The third rotational member 1110 can define the handle pivots 274 and can provide the attachment axis to secure the distal end 1140 of the locking member 216 to the rotational member 1110 passing through the handle pivots 274. The third rotational member 1110 can connect two handle pivots 274.

The fourth rotational member 1120 can define the rear pivots 244 and can provide the attachment axis to secure the proximal end 1160 of the locking member 216 to the base member 210. The fourth rotational member 1120 can connect to rear pivots 244.

Figure 12:
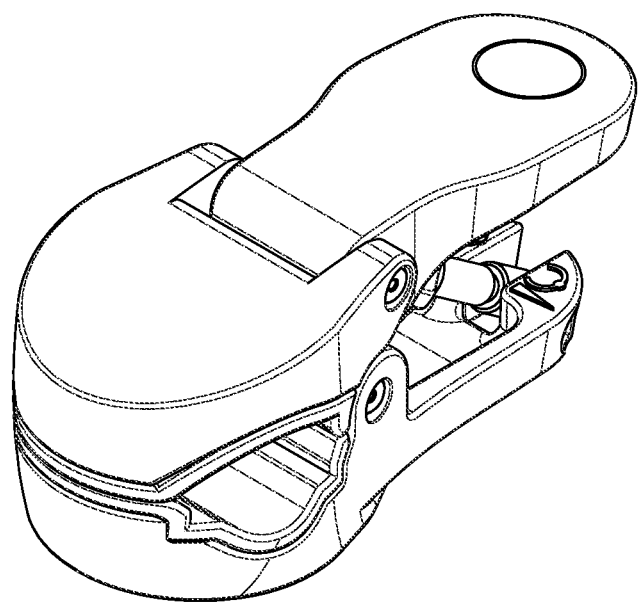
FIGS. 12-13 show a top three-quarter view and a bottom three-quarter view, respectively.
Figure 13:
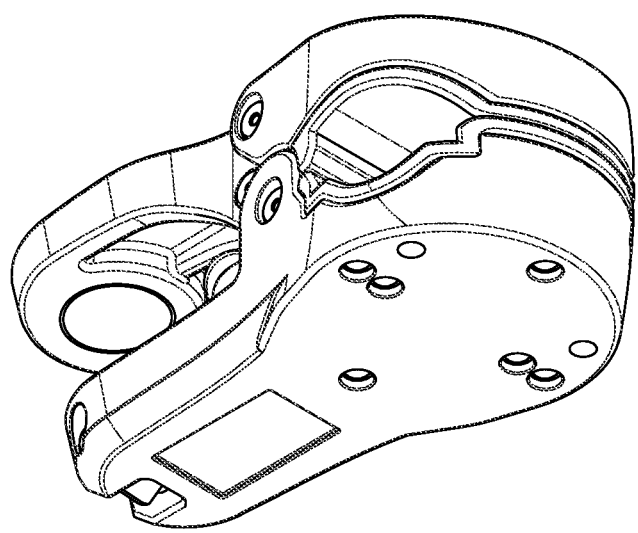

FIGS. 12-13 show a top three-quarter view and a bottom three-quarter view, respectively.

Figure 14:
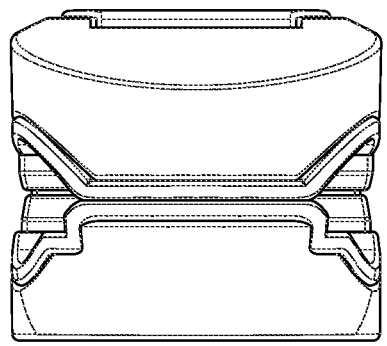
FIGS. 14-15 show a front view and a rear view, respectively.
Figure 15:
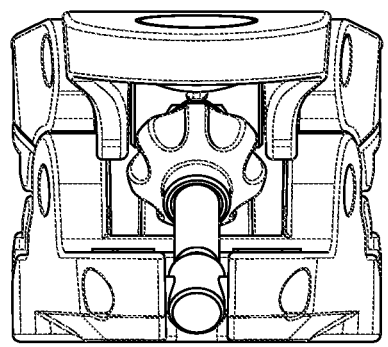

FIGS. 14-15 show a front view and a rear view, respectively.

Figure 16:
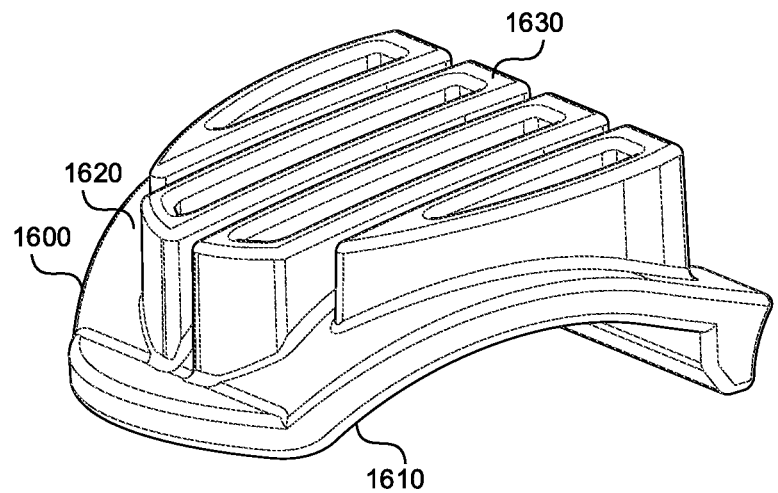
FIGS. 16-17 show a polymer material lining a perimeter of the upper concave recess and the base concave recess.
Figure 17:
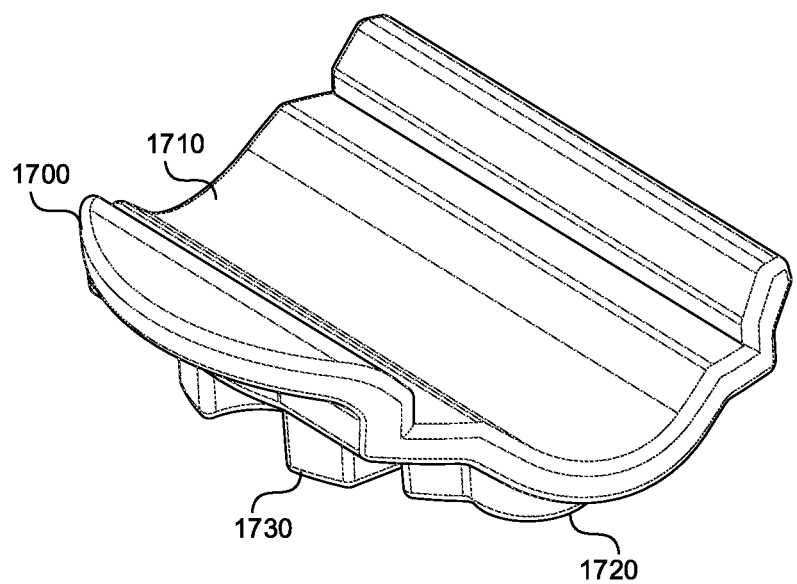

FIGS. 16-17 show a polymer material lining a perimeter of the upper concave recess and the base concave recess. The polymer material 1600, 1700 can increase friction with an object clampingly engaged with the upper jaw and the base jaw and can prevent the jaws from sliding relative to the clamped object. Surfaces 1610 and 1710 come in contact with the clamped object. Surfaces 1620 and 1720 press against the upper and base jaws, respectively. Surfaces 1620 and 1720 have protrusions 1630 (only one labeled for brevity), 1730 (only one labeled for brevity) which are inserted into corresponding recesses in the upper and base jaws, respectively. The protrusions 1630, 1730 serve to attach the polymer material 1600, 1700 to the upper and base jaws.

Figure 18:
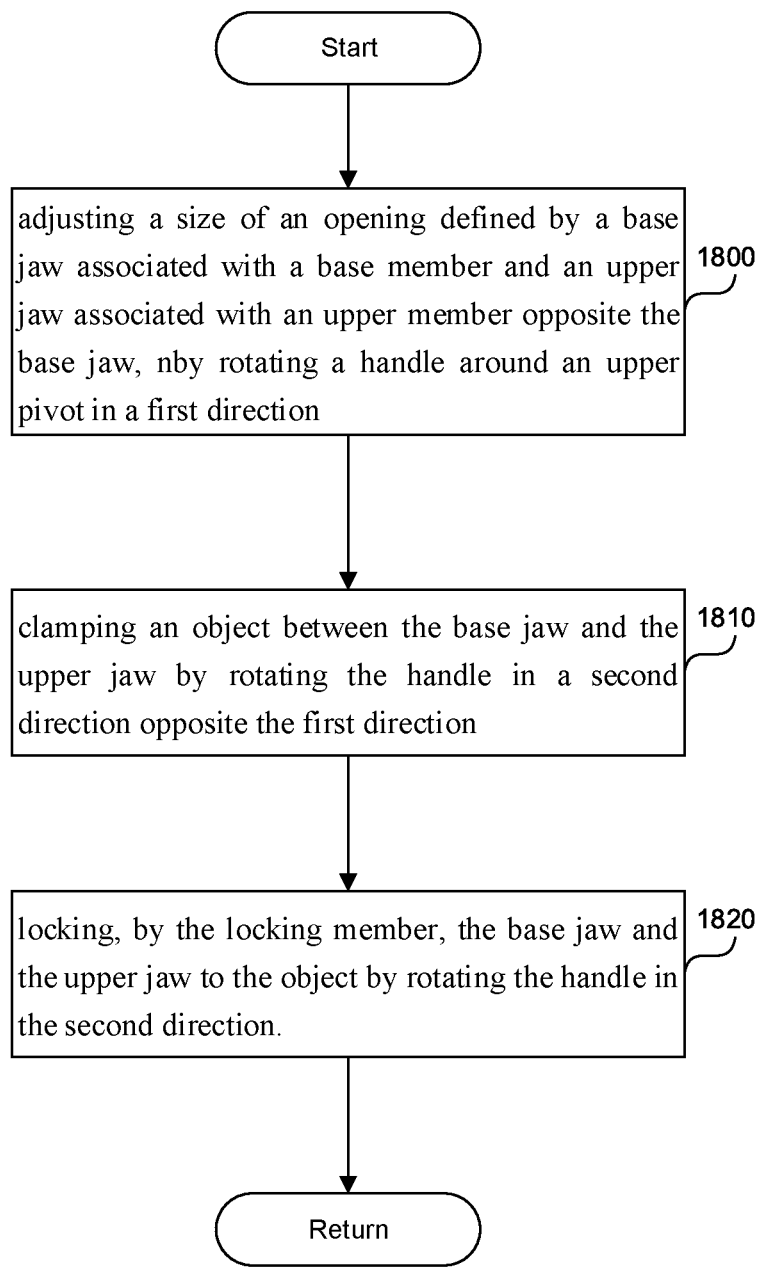
FIG. 18 is a flowchart of a method to operate the clamp.

FIG. 18 is a flowchart of a method to operate the clamp. In step 1800, a size of an opening defined by a base jaw and the upper jaw can be adjusted. The base jaw is a part of the base member, while the upper jaw is a part of an upper member opposite the base jaw. The size of the opening can be adjusted by rotating a handle around a second upper pivot in a first direction. The second upper pivot can secure the handle to the upper member. The rotation of the handle can cause a rotation of the upper member around a medial pivot, which can secure the upper member to the base member.

In step 1810, an object can be clamped between the base jaw and the upper jaw by rotating the handle in a second direction opposite the first direction. In step 1820, the clamp can be locked into position by a locking member. The locking can occur when the base jaw and the upper jaw are locked to the object by rotating the handle in the second direction. The locking member can be secured to a handle pivot of the handle and to a rear pivot of the base handle. The length of the locking member can determine a distance between the handle pivot and the rear pivot and can prevent a variation in the distance. The locking member can cause the locking when an angle at the handle pivot with respect to the second upper pivot and the rear pivot exceeds 180°.

The length of the locking member can be adjusted via a control member forming a part of the locking member. The control member can be a thumb dial as shown in FIG. 9. When the control member is rotated, the control member can slide up and down the bar of the locking member, thus adjusting the length of the locking member, and consequently adjusting the locking position of the pole clamp.

Remarks

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. An apparatus comprising:
a base member comprising a base jaw, a medial portion and a base handle, the base jaw defining a base concave recess with base transverse ridges, the medial portion having a medial aperture defining a medial pivot, the base handle having a rear aperture defining a rear pivot, the base handle bisected by a notch coaxial with the rear pivot;
an attachment mechanism defined by a surface opposite the base concave recess and partially extending through the base jaw, the attachment mechanism comprising a plurality of attachment members, each attachment member to engage with a corresponding attachment member and to partially support a weight of an object associated with the corresponding attachment member;
an upper member comprising an upper jaw and a rear portion, the upper jaw defining an upper concave recess with upper transverse ridges opposite the base concave recess, the rear portion having a first upper aperture pivotally secured in a coaxial arrangement to the medial pivot of the base member and having a second upper aperture defining a second upper pivot;
a handle defining a first handle aperture pivotally secured in a coaxial arrangement to the second upper pivot of the upper member, the handle having a second handle aperture defining a handle pivot; and
a locking member having a proximal end and a distal end, the proximal end mounted within the notch of the base member and pivotally secured to the rear pivot of the base member, the distal end pivotally secured to the handle pivot, the locking member to lock a position of the upper jaw with respect to the base jaw when the handle pivot creates an angle greater than 180° with respect to the second upper pivot and the rear pivot of the base member.

2. The apparatus of claim 1, the handle to unlock the position of the upper jaw with respect to the base jaw upon exertion of pressure in a particular direction.

3. The apparatus of claim 1, a polymer material lining a perimeter of the upper concave recess and the base concave recess, the polymer material to increase friction with a second object clampingly engaged with the upper jaw and the base jaw and to prevent a sliding of the jaws relative to the second object.

4. An apparatus comprising:
a base member comprising a base jaw, a medial portion and a base handle, the base jaw defining a base concave recess, the medial portion having a medial aperture defining a medial pivot, and the base handle having a rear aperture defining a rear pivot;
an attachment mechanism defined by a surface opposite the base concave recess and partially extending through the base jaw, the attachment mechanism comprising a plurality of attachment members, each attachment member to engage with a corresponding attachment member and to partially support a weight of an object associated with the corresponding attachment member;

an upper member comprising an upper jaw and a rear portion, the upper jaw defining an upper concave recess, the rear portion having a first upper aperture pivotally secured in a coaxial arrangement to the medial pivot of the base member and having a second upper aperture defining a second upper pivot;

a handle defining a first handle aperture pivotally secured in a coaxial arrangement to the second upper pivot of the upper member, the handle having a second handle aperture defining a handle pivot; and a locking member having a proximal end and a distal end, the proximal end pivotally secured to the rear pivot of the base member, the distal end pivotally secured to the handle pivot, the locking member to lock a position of the upper jaw with respect to the base jaw.

5. The apparatus of claim 4, the handle to unlock the position of the upper jaw with respect to the base jaw upon exertion of pressure in a particular direction.

6. The apparatus of claim 4, a polymer material lining a perimeter of the upper concave recess and the base concave recess, the polymer material to increase friction with the object clampingly engaged with the upper jaw and the base jaw and to prevent a sliding of the jaws relative to the object.

7. The apparatus of claim 6, the polymer material having a hardness of at least 60 durometers.

8. The apparatus of claim 4, the attachment member comprising a threaded mounting hole.

9. The apparatus of claim 4, the medial portion of the base member having a base protrusion defining a region of enlarged thickness surrounding the medial pivot.

10. The apparatus of claim 4, the base handle bisected by a notch coaxial with the rear pivot.

11. The apparatus of claim 4, the handle comprising a handle protrusion defining a region of enlarged thickness surrounding the handle pivot.

12. The apparatus of claim 4, the locking member comprising a control member rotationally secured to the locking member, a rotational motion of the control member to adjust a length of the locking member and a size of an opening between the base jaw and the upper jaw.

13. The apparatus of claim 4, the apparatus operable with a single hand of a user.

14. The apparatus of claim 4, the handle having a reduced thickness proximate to the coaxial arrangement with the second upper pivot.

15. The apparatus of claim 4, the handle comprising an indication of where to exert pressure.

16. The apparatus of claim 4, comprising:
a first rotational member, circularly symmetric, defining the medial pivot and providing an attachment axis for the coaxial arrangement between the medial pivot and the first upper aperture;

a second rotational member, circularly symmetric, defining the second upper pivot and providing an attachment axis for the coaxial arrangement between the second upper pivot and the first handle aperture;

a third rotational member, circularly symmetric, defining the handle pivot and providing an attachment axis to secure the distal end of the locking member to the handle; and a fourth rotational member, circularly symmetric, defining the rear pivot and providing an attachment axis to secure the proximal end of the locking member to the base member.

17. The apparatus of claim 4, a rear portion of the handle extending beyond a rear portion of the base handle.

18. A method comprising:
adjusting a size of an opening defined by a base jaw associated with a base member and an upper jaw associated with an upper member opposite the base jaw, by rotating a handle around a second upper pivot in a first direction, the second upper pivot securing the handle to the upper member, said rotating the handle causing a rotation of the upper member around a medial pivot securing the upper member to the base member;

clamping an object between the base jaw and the upper jaw by rotating the handle in a second direction opposite the first direction;

locking, by a locking member, the base jaw and the upper jaw to the object by rotating the handle in the second direction, wherein the locking member is secured to a handle pivot of the handle and to a rear pivot of the base member, a length of the locking member determining a distance between the handle pivot and the rear pivot and preventing a variation in the distance, the locking member causing said locking when an angle at the handle pivot with respect to the second upper pivot and the rear pivot exceeds 180°; and attaching a second object using an attachment mechanism defined by a surface opposite a base concave recess and partially extending through the base jaw, the attachment mechanism comprising a plurality of attachment members, each attachment member to engage with a corresponding attachment member and to partially support a weight of the second object associated with the corresponding attachment member.

19. A method of claim 18, comprising:
adjusting the length of the locking member via a control member forming a part of the locking member, by rotating the control member to adjust the length of the locking member.

20. The apparatus of claim 4, the plurality of attachment members arranged in a coplanar fashion.

21. The apparatus of claim 4, the plurality of attachment members comprising a first plurality of attachment members axially aligned along a first axis, and a second plurality of attachment members axially aligned along a second axis, wherein the first axis and the second axis are different.

* * * * *